United States Patent [19]

Price et al.

[11] 4,397,359

[45] Aug. 9, 1983

[54] TRACTOR HITCH WITH YOKE HAVING PIVOTALLY SUPPORTED UPPER END

[75] Inventors: David S. Price, Kentwood; Richard A. Schafer, Traer, both of Mich.; Carl E. Kittle, Cedar Falls, Iowa

[73] Assignee: Deere & Company, Moline, Ill.

[21] Appl. No.: 257,688

[22] Filed: Apr. 27, 1981

[51] Int. Cl.$^2$ ............................................. A01B 63/112
[52] U.S. Cl. ........................................ 172/430; 172/7; 172/448; 172/450; 280/446 A
[58] Field of Search .......... 280/446 A, 456 A, 460 A, 280/461 A, 479 A, 490 A; 172/7, 9, 439, 443, 448, 450, 482, 491, 680

[56] References Cited

U.S. PATENT DOCUMENTS

| | | | |
|---|---|---|---|
| 2,402,008 | 6/1946 | Ariens | 172/491 |
| 2,496,474 | 2/1950 | Hyman | 280/479 A |
| 2,656,776 | 10/1953 | Cox et al. | 172/491 X |
| 2,683,403 | 7/1954 | Flentie | 172/7 |
| 2,914,342 | 11/1959 | Silver | 280/461 A |
| 3,078,930 | 2/1963 | Foote | 172/491 |
| 3,255,828 | 6/1966 | Abbott | 172/7 |
| 3,516,498 | 6/1970 | Schowalter | 172/9 |
| 3,627,053 | 12/1971 | Hook et al. | 172/9 |
| 3,670,822 | 6/1972 | Reinhardt | 172/7 |
| 3,791,456 | 2/1974 | Koch | 172/450 |
| 3,940,000 | 5/1976 | Mousel | 172/491 X |
| 4,164,985 | 8/1979 | Bobard | 280/461 A X |
| 4,173,352 | 11/1979 | van der Lely | 280/460 A X |
| 4,216,975 | 8/1980 | Schafer | 280/461 A |
| 4,318,445 | 3/1982 | Schuck | 280/456 A X |

FOREIGN PATENT DOCUMENTS

| | | |
|---|---|---|
| 54513 | 3/1967 | Fed. Rep. of Germany ...... 172/439 |
| 614482 | 12/1948 | United Kingdom . |
| 845238 | 8/1960 | United Kingdom . |
| 1113681 | 5/1968 | United Kingdom . |
| 1500179 | 2/1978 | United Kingdom . |

*Primary Examiner*—Richard T. Stouffer

[57] ABSTRACT

A hitch system includes a yoke pivotally supported by the ends of a rockshaft extending from the sides of the tractor housing. The yoke includes left and right side panels and a two-piece bottom. A drawbar is pivotally coupled to the yoke between the two bottom pieces. Left and right draft links have fore ends pivotally coupled to the yoke and are sway limited in the down position by sway links connecting each draft link with an inboard portion of the yoke. The draft links are sway limited in the raised position by sway surfaces on the sides of the yoke. Lift arms are splined to the rockshaft ends and are pivoted by a pair of lift cylinders coupled between the lift arms and the housing. A pair of lift links connect the lift arms to the draft links. A yoke positioning and draft sensing link includes a fore end connected to a bottom side of the housing and an aft end connected to the yoke. Draft loads from the draft links and from the drawbar are communicated via the yoke to a draft sensor in the yoke positioning and draft sensing link.

21 Claims, 2 Drawing Figures

TRACTOR HITCH WITH YOKE HAVING PIVOTALLY SUPPORTED UPPER END

BACKGROUND OF THE INVENTION

The present invention relates generally to tractor hitches and more particularly, to an improved hitch configuration, including a pivotal yoke.

U.S. Pat. No. 4,216,975 discloses a tractor hitch with draft links and a drawbar connected to a bell crank pivotally supported with respect to the rear axle housing of the tractor. The bell crank in the '975 patent includes a relatively long, upwardly extending crank arm and a relatively short, downwardly extending link ear which is coupled to the draft links, the drawbar and the sway links. A bell crank actuator, with or without load sensing, is then coupled between the tractor frame and the upper end of the crank arm to pivot the bell crank to adjust the position of the draft links and the drawbar. In such a hitch, the pivotal support of the bell crank must support substantial force loads, including a substantially horizontal component due primarily to the draft force transmitted to the hitch from the implement. This force loading produces frictional losses which create an undesirable hysteretic error effect with respect to the draft sensing performance of this hitch arrangement. Another problem is that the '975 drawbar is pivotally coupled to the bell crank at the fore end of the drawbar, while the aft end of the drawbar is supported by the coupler support, thus limiting the drawbar to only horizontal fore-and-aft movement as the bell crank pivots. The '975 hitch arrangement also suffers from a lack of compactness which could prevent its use on certain types of two-wheel drive tractors unless substantial modifications are made. The '975 hitch also requires a relatively long actuator stroke to achieve a relatively short fore-and-aft movement of the draft links and drawbar because the crank arm is substantially longer than the link ear.

SUMMARY OF THE INVENTION

An advantage of the present invention is that it provides a hitch structure with draft sensing less subject to frictional hysteretic error effects.

Another advantage of the present invention is that it provides a drawbar which is swung so it can be positioned horizontally and vertically.

Another advantage of the present invention is that it provides a hitch structure with a high degree of compactness.

Another advantage of the present invention is that it provides a hitch structure which can be positioned with a shorter hydraulic actuator.

A further advantage of the present invention is that the underside location of the draft sensor and the positioning cylinder avoid interference with the components of two-wheel drive tractors.

Another advantage of the present invention is that it provides a hitch structure which does not interfere with rearward visibility from the tractor cab.

DETAILED DESCRIPTION

Figure 1:
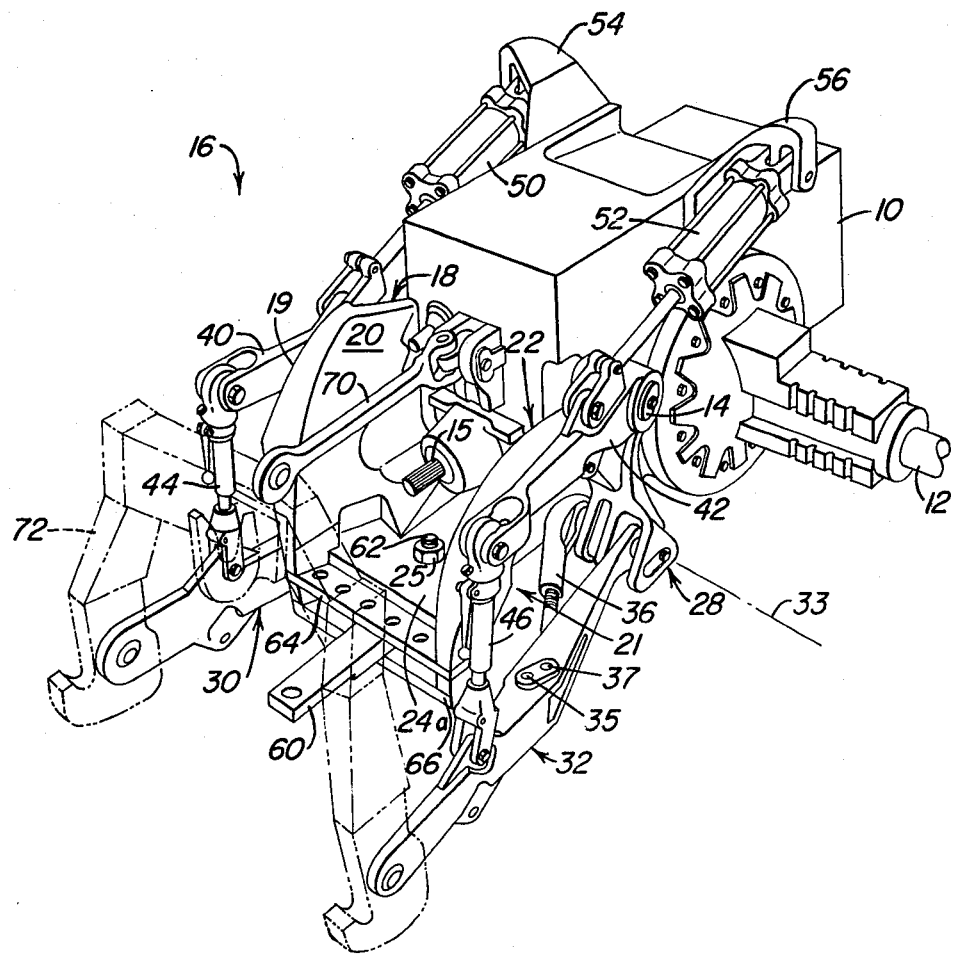
FIG. 1 is a view of the applicants' invention looking forward and down from the right rear of the tractor.

A tractor housing 10 encloses a transmission (not shown), a rear axle 12, a rockshaft 14, and a PTO shaft 15. An attaching mechanism 16 allows an implement (not shown) to be connected to the tractor housing or frame 10.

Figure 2:
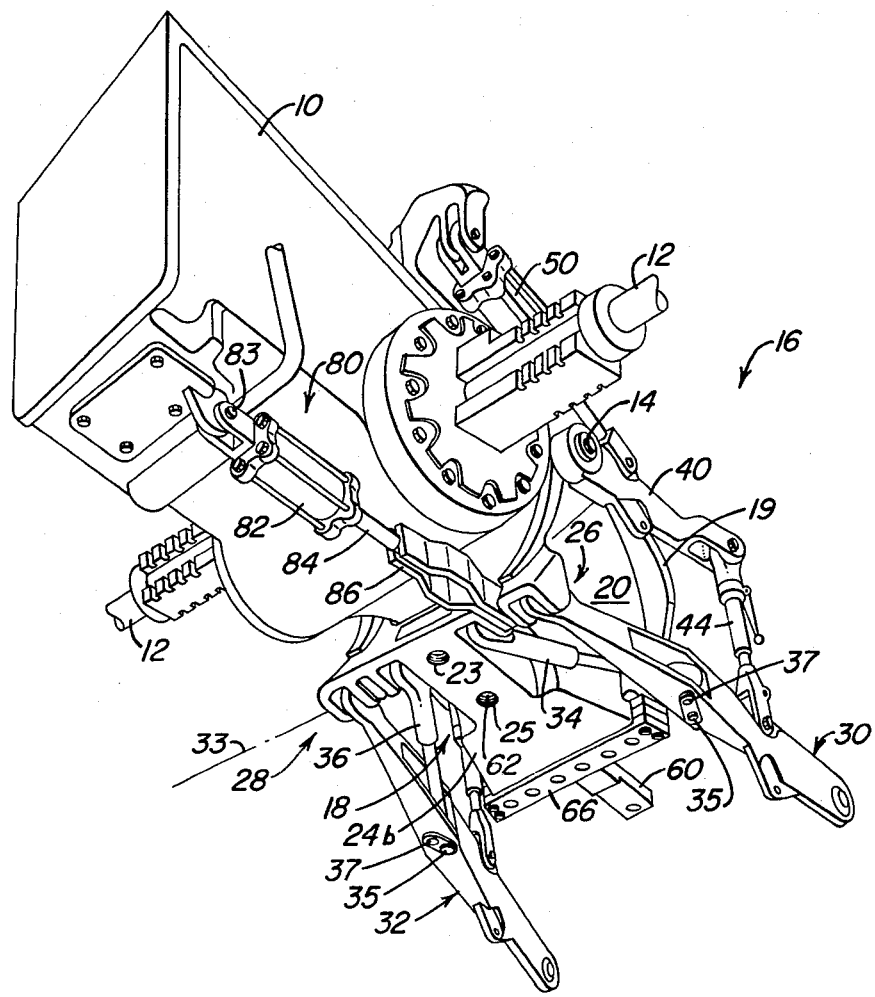
FIG. 2 is a view of applicants' invention looking rearward and up from beneath the rear axle housing.

The attaching mechanism 16 includes a yoke or lever member 18 having left and right vertically-oriented side panels 20 and 22 rigidly interconnected at their bottom ends by a bottom panel with upper and lower plates 24a and 24b. The bottom panel includes a pair of vertically extending drawbar coupling holes 23 and 25. The upper fore portions of each side panel 20 and 22 are pivotally supported by the left and right extensions of the rockshaft 14 via bearings (not shown). The lower forward portion of the yoke includes left and right bearing supports 26 and 28. Each bearing support 26 and 28 holds a pair of spherical bearings, such as described in U.S. Pat. No. 4,216,975. The left and right outboard bearings pivotally couple the yoke to the fore ends of left and right draft links 30 and 32, respectively. The curved aft ends of the side panels include laterally projecting sway surfaces 19 and 21 which are engageable with the draft links 30 and 32 to lock out sway of the draft links only when the draft links are in a raised position. Surface 21 is obscured by the lift arm 42 and the lift link 46 in FIG. 1, but is identical to surface 19, as seen in FIG. 2. The inboard left and right bearings pivotally couple the yoke to fore ends of left and right sway links 34 and 36, respectively. The aft end of each left and right sway link 34 and 36 includes an elongated aperture (not shown) which receives a pin which extends vertically through either of bores 35 or 37 in the central portion of the respective draft links 30 and 32. Thus, the pin may be positioned in bore 35 to totally prevent outward sway of the draft links or the pin may be positioned in bore 37 to permit a limited amount of sway. Each sway link 34 and 36 also includes a threaded rod and sleeve to provide a length fine adjustment. A laterally extending coupling axis 33 extends through the fore ends of the draft links 30, 32 and the sway links 34, 36. When the draft links 30 and 32 are in the lowered position, they do not engage the sway surfaces 19 and 21. Instead, sway in the down position of the draft links is resisted by sway links 34 or 36 which transmit sway forces to the yoke 18 and, in turn, to the pivot bearing support at the rockshaft 14.

Left and right lift arms 40 and 42 include fore ends which are splined to respective left and right ends of the rockshaft 14 for rotation therewith. The aft ends of lift arms 40 and 42 are pivotally coupled to the upper ends of respective left and right lift links 44 and 46. The lower ends of the lift links 44 and 46 are pivotally coupled to the draft links 30 and 32. Either or both of the lift links 44 and 46 could be replaced with a hydraulic cylinder to aid in vertical adjustment of the draft links 30 and 32 for implement coupling and in-field adjustment. Left and right lift cylinders 50 and 52 are pivotally supported at one end by extensions 54 and 56 of the housing 10. The rod ends of the lift cylinders 50 and 52 are pivotally connected to the lift arms 40 and 42 so that the lift cylinders may be actuated to pivot the lift arms and rotate the rockshaft to thereby raise or lower the draft links 30 and 32.

A drawbar 60 includes a fore end which is sandwiched between the upper and lower plates 24a and 24b of the two-piece bottom yoke panel and pivotally coupled thereto about a vertically-oriented coupling pin 62 which defines a vertically extending coupling axis. The lower rear portions of the side panels 20 and 22 support a pair of horizontally extending apertured plates 64 and 66 between which extends the aft end of the drawbar 60. Pins may be inserted into certain ones of the apertures in plates 64 and 66 to limit the lateral motion of the drawbar 60. Three vertically extending coupling holes (not shown) extend through the forward portion of the drawbar 60 so that together, with the two yoke holes 23 and 25, the drawbar 60 can be pivotally coupled to the yoke 18 in various positions to substantially vary the effective length of the drawbar relative to the PTO shaft without the addition of multiple sections to the aft end of the drawbar. In this manner, different PTO shaft lengths can be accommodated.

A center or top link 70 is pivotally coupled to the rear of the housing 10 above the PTO shaft 15. An inverted U-shaped coupler frame 72, shown in dashed lines in FIG. 1 and similar to one shown in U.S. Pat. No. 4,216,975, may be connected to and supported by the aft ends of the draft links 30 and 32 and by the aft end of the top link 70.

A positioning link 80 is coupled between the underside of the housing 10 and the lower fore portion of the yoke 18. Link 80 includes an extendible hydraulic actuator or cylinder 82 with its fore end pivotally coupled to the housing 10 at 83. The aft end of the rod 84 of actuator 82 is fixed to one end of a capacitive-type load or force sensor 86, such as described in detail in co-pending U.S. application, Ser. No. 228,440, filed January 26, 1981. Although the load sensor 86, shown in FIG. 2, is of the capacitive type, it is within the scope of the instant invention to use other types of load sensors, such as resistive or inductive types. The other end of load sensor 86, (which comprises the aft end of link 80), is pivotally coupled to the yoke 18 so that the coupling axis 33 extends through the aft end of the pivotally coupled load sensor 86. If load sensing is not required, then the load sensor 86 could be eliminated and in this case, the aft end of a longer actuator rod would be pivotally coupled to the yoke 18. Note that no part of the load sensor 86 is mechanically connected to the housing, thus resulting in simple and compact arrangement of the link 80 and the load sensor 86. By positioning the positioning link 80 and the associated load sensor on the underside of the rear axle housing 10, the positioning link 80 would not interfere with other components positioned on the rear of the tractor. This arrangement also provides good rearward visibility for the operator's task of maneuvering the hitch into proper position for connecting to an implement. If neither load sensing or yoke pivoting is required, then link 80 could be replaced by a rigid strut (not shown).

MODE OF OPERATION

To adjust the position of either the draft links 30 and 32 or the drawbar 60, hydraulic fluid is pumped into or out of cylinder 82 to extend or retract the positioning link 80. This causes the yoke 18 to pivot about the axis of the rockshaft 14. Since the axis of rockshaft 14 is substantially above the level of the draft links and the drawbar, this pivoting produces a substantially horizontal fore-and-aft movement of the draft links 30 and 32 and a swinging or scooping movement of the drawbar 60. Vertical positioning of the draft links 30 and 32 is achieved by forcing fluid into or out of lift cylinders 50 and 52, thereby causing the draft links to pivot with respect to the yoke 18 about the coupling axis 33. If the lift cylinders 50 and 52 are double-acting, as shown, then a downward hydraulic force can be exerted on the draft links 30 and 32. Such a downward force could be useful when an implement, such as a blade, (not shown), is connected to the draft links.

A drawbar-towed implement, (not shown), may be coupled to the aft end of the drawbar in the conventional manner. A hitch-coupled implement, (not shown), may be coupled to the coupler frame 72, or, in the absence of the coupler frame, directly to the aft ends of the draft links and the upper link. Whichever implement is attached, the draft forces created by the engagement of the implement with the ground are communicated to the yoke 18 via either the drawbar 60 or the draft links 30 and 32. From the yoke 18, a component of the draft force is communicated to the positioning link 80 where it may be sensed by the load sensor 86. Depending upon what type of draft sensor is utilized, then a draft control system, such as described in U.S. Pat. No. 4,064,945, may then be used to control the vertical position of the draft links 30 and 32 in the case of a hitch-mounted implement, or to control the remote cylinders, (not shown), on a towed implement, (not shown), as a function of the sensed draft force. Because link 80, the draft links 30 and 32 and the drawbar 60 are all nearly oriented within a single plane, substantially all of the horizontal components of draft force is transmitted directly to the link 80. Thus, the pivotal support of the yoke 18 via the rockshaft 14 does not support the component of the draft force which is transmitted to the link 80, thereby reducing the amount of frictional losses generated at this pivotal support. This reduction of frictional losses reduces the hysteretic error in the overall operation of this attaching mechanism with respect to draft force sensing.

We claim:
1. An attaching mechanism for coupling a ground-engaging implement to a vehicle, comprising:
   a housing supporting a rear vehicle axle;
   a yoke with upper and lower portions, the upper portion being pivotally supported adjacent to the housing;
   an implement coupler having a fore end pivotally coupled to the lower portion of the yoke and having an aft implement coupling end; and
   a load sensing link having a fore end coupled to the housing and having an aft end pivotally coupled to the lower portion of the yoke, the load sensing link including sensing means mechanically connected only to the load sensing link and interconnecting the fore and aft ends thereof for sensing draft load transmitted to the yoke from the implement coupler, the load sensing link further comprising power means interconnecting the ends thereof for adjusting the length of the load sensing link to pivot the yoke and adjust the fore and aft position of the implement coupling means.
2. The attaching mechanism of claim 1, wherein:
   the implement coupler is pivotal with respect to the yoke about a left and right extending coupling axis, the coupling axis extending through the aft end of the load sensing link.
3. The attaching mechanism of claim 1, further comprising:
   a rotatable rockshaft carried by the housing; and bearing means mounted on the rockshaft for pivotally supporting the yoke and for allowing relative rotation therebetween.

4. The attaching mechanism of claim 3 further comprising:
a center link having a fore end pivotally coupled to the housing and having an aft end projecting rearwardly therefrom;
left and right lift arms fixed for rotation with respective left and right ends of the rockshaft;
left and right lift cylinders coupled between the housing and the respective left and right lift arm and actuatable to pivot the rockshaft and the lift arms; and
left and right lift links having upper ends coupled to the left and right lift arms and having lower ends, the implement coupler comprising left and right draft links having fore ends pivotally coupled to left and right outboard portions of the yoke, aft ends projecting rearwardly therefrom and central portions coupled to respective left and right lift links, the lift cylinders being actuatable to pivot the lift arms and the rockshaft to thereby adjust the position of the lift links and the draft links.

5. The invention of claim 1, wherein:
the load sensing link is positioned below a horizontal plane containing the rear axle.

6. The invention of claim 1, wherein:
the implement coupler comprises a drawbar pivotally coupled to the lower portion of the yoke, the drawbar being pivotal laterally with respect to the yoke about a vertically extending coupling axis.

7. The attaching mechanism of claim 1, further comprising:
a sway link having a fore end coupled to the yoke inboard of the implement coupler and having an aft end coupled to the implement coupler, the sway link limiting sway of the implement coupler when the implement coupler is in a lowered position, the yoke including abutment means for engaging the implement coupler to limit the sway thereof when the implement coupler is in a raised position.

8. An attaching mechanism for coupling a ground-engaging implement to a vehicle, comprising:
a housing supporting a rear vehicle axle;
a yoke with upper and lower portions, the upper portion being pivotally supported adjacent to the housing;
an implement coupler having a fore end pivotally coupled to the lower portion of the yoke and having an aft implement coupling end;
a load sensing link having a fore end coupled to the housing and having an aft end pivotally coupled to the lower portion of the yoke, the load sensing link including sensing means mechanically connected only to the load sensing link and interconnecting the fore and aft ends thereof for sensing draft loads transmitted to the yoke from the implement coupler;
a rotatable rockshaft carried by the housing;
bearing means mounted on the rockshaft for pivotally supporting the yoke and for allowing relative rotation therebetween;
a center link having a fore end pivotally coupled to the housing and having an aft end projecting rearwardly therefrom;
left and right lift arms fixed for rotation with respective left and right ends of the rockshaft;
left and right lift cylinders coupled between the housing and the respective left and right lift arms and actuatable to pivot the rockshaft and the lift arms; and
left and right lift links having upper ends coupled to the left and right lift arms and having lower ends, the implement coupler comprising left and right draft links having fore ends pivotally coupled to left and right outboard portions of the yoke, aft ends projecting rearwardly therefrom and central portions coupled to respective left and right lift links, the lift cylinders being actuatable to pivot the lift arms and the rockshaft to thereby adjust the position of the lift links and the draft links.

9. An attaching mechanism for coupling a ground-engaging implement to a vehicle, comprising:
a housing supporting a rear vehicle axle;
a yoke with upper and lower portions, the upper portion being pivotally supported adjacent to the housing;
an implement coupler having a fore end pivotally coupled to the lower portion of the yoke and having an aft implement coupling end;
a load sensing link having a fore end coupled to the housing and having an aft end pivotally coupled to the lower portion of the yoke, the load sensing link including sensing means mechanically connected only to the load sensing link and interconnecting the fore and aft ends thereof for sensing draft loads transmitted to the yoke from the implement coupler; and
a sway link having a fore end coupled to the yoke inboard of the implement coupler and having an aft end coupled to the implement coupler, the sway link limiting sway of the implement coupler when the implement coupler is in a lowered position, the yoke including abutment means for engaging the implement coupler to limit the sway thereof when the implement coupler is in a raised position.

10. An attaching mechanism for coupling a ground-engaging implement to a vehicle, comprising:
a housing supporting a rear vehicle axle;
a yoke with upper and lower portions, the upper portion being pivotally supported adjacent to the housing;
a drawbar having a fore end pivotally coupled to the lower portion of the yoke and having an aft implement coupling end;
a load sensing link having a fore end coupled to the housing and having an aft end pivotally coupled to the lower portion of the yoke, the load sensing link including sensing means interconnecting the fore and aft ends thereof for sensing draft loads transmitted to the yoke from the drawbar;
a rockshaft pivotally supported by the housing;
left and right draft links having aft ends and having fore ends pivotally coupled to respective left and right outboard portions of the yoke;
a center link having a fore end pivotally coupled to the housing and having an aft end projecting rearwardly therefrom;
left and right lift arms fixed for rotation with respective left and right ends of the rockshaft;
left and right lift cylinders coupled between the housing and the respective left and right lift arms and actuatable to pivot the rockshaft and the lift arms; and a left lift link having an upper end coupled to the left lift arm and having a lower end coupled to the left draft link, and a right lift link having an upper end coupled to the right lift arm and having a lower end coupled to the right draft link, the lift cylinders being actuatable to pivot the rockshaft and the lift arms to thereby adjust the position of the lift links, the draft links and the drawbar.

11. The attaching mechanism of claim 10, further comprising:
left and right sway links, each having an aft end coupled to a respective one of the left and right draft links, and each having a fore end coupled to the yoke inboard of the fore end of a respective one of the left and right draft links.

12. An attaching mechanism for coupling a ground-engaging implement to a vehicle, comprising:
a housing supporting a rear vehicle axle;
a yoke with upper and lower portions, the upper portion being pivotally supported adjacent to the housing;
a drawbar having a fore end pivotally coupled to the lower portion of the yoke and having an aft implement-coupled end;
a variable length actuator link having a fore end coupled to the housing and having an aft end coupled to the lower portion of the yoke, the actuator link including power means for adjusting the length of the actuator link to pivot the yoke and vary the position of the drawbar;
a rockshaft pivotally supported by the housing;
left and right draft links having aft ends and having fore ends pivotally coupled to respective left and right outboard portions of the yoke;
a coupling member mountable on the draft links and having releasable implement-engaging means thereon;
a center link having a fore end pivotally coupled to the housing and having an aft end projecting rearwardly therefrom;
left and right lift arms fixed for rotation with respective left and right ends of the rockshaft;
left and right lift cylinders coupled between the housing and the respective left and right lift arms and actuatable to pivot the lift arms and the rockshaft; and
a left link having an upper end coupled to the left lift arm and having a lower end coupled to the left draft link, and a right lift link having an upper end coupled to the right lift arm and having a lower end coupled to the right draft link, the lift cylinders being actuatable to pivot the rockshaft and the lift arms to thereby adjust the position of the lift links, the draft links and the coupling member.

13. The invention of claim 12, further comprising:
left and right sway links for limiting lateral motion of the draft links, the left sway link having an aft end coupled to a central portion of the left draft link and having a fore end pivotally coupled to the yoke inboard from the fore end of the left draft link, the right sway link having an aft end coupled to a central portion of the right draft link and having a fore end pivotally coupled to the yoke inboard of the fore end of the right draft link.

14. An attaching mechanism for coupling an implement to a vehicle, comprising:
a housing supporting a rear vehicle axle;
a yoke with upper and lower portions, the upper portion being pivotally coupled to the housing;
a draft link having a fore end pivotally coupled to the lower portion of the yoke and having an aft implement coupling end;
a load sensing link having a fore end coupled to the housing and having an aft end coupled to the lower portion of the yoke, the load sensing link including sensing means mechanically connected only to the load sensing link and interconnecting the fore and aft ends thereof for sensing draft loads transmitted to the yoke from the draft link; and
a sway link having a fore end coupled to the yoke inboard of the draft link and having an aft end coupled to the draft link, the sway link limiting sway of the draft link when the draft link is in a lowered position, the yoke including abutment means for engaging the draft link to limit the sway thereof when the draft link is in a raised position.

15. An attaching mechanism for coupling a ground-engaging implement to a vehicle, comprising:
a housing supporting a rear vehicle axle;
a yoke with upper and lower portions, the upper portion being pivotally supported adjacent to the housing;
an implement coupler having a fore end pivotally coupled to the lower portion of the yoke and having an aft implement coupling end;
a variable length actuator link having a fore end coupled to the housing and having an aft end coupled to the lower portion of the yoke, the actuator link including power means for adjusting the length of the actuator link to pivot the yoke and vary the position of the implement coupler;
a rockshaft pivotally supported by the housing;
a center link having a fore end pivotally coupled to the housing and having an aft end projecting rearwardly therefrom;
left and right lift arms fixed for rotation with respective left and right ends of the rockshaft;
left and right lift cylinders coupled between the housing and the respective left and right lift arm and actuatable to pivot the rockshaft and the lift arms; and
left and right lift links having upper ends coupled to the left and right lift arms and having lower ends, the implement coupler comprising left and right draft links having fore ends pivotally coupled to left and right outboard portions of the yoke, aft ends projecting rearwardly therefrom and central portions coupled to respective left and right lift links, the lift cylinders being actuatable to pivot the lift arms and the rockshaft to thereby adjust the position of the lift links and the draft links.

16. The invention of claim 15, further comprising:
left and right sway links, each having an aft end coupled to a respective one of the left and right draft links, and each having a fore end coupled to the yoke inboard of the fore end of a respective one of the left and right draft links.

17. An attaching mechanism for coupling an implement to a vehicle, comprising:
a housing supporting a rear vehicle axle;
a yoke comprising left and right side panels having upper portions pivotally supported by left and right extending portions of the rockshaft, respectively, and comprising a generally horizontally extending bottom panel interconnecting lower portions of the side panels;

an implement coupler having a fore end pivotally coupled to a lower portion of the yoke and having an aft implement coupling end; and a load sensing link having a fore end coupled to a lower side of the housing and having an aft end pivotally coupled to the bottom panel, the load sensing link including sensing means disposed between the fore and aft ends thereof for sensing draft loads transmitted to the yoke from the implement coupler.

18. An attaching mechanism for coupling an implement to a vehicle, comprising:

a housing supporting a rear vehicle axle;

a yoke comprising left and right side panels having upper portions pivotally supported by left and right extending portions of the rockshaft, respectively, and comprising a generally horizontally extending bottom panel interconnecting lower portions of the side panels;

a drawbar having a fore end pivotally coupled to the bottom panel and having an aft implement coupling end; and a load sensing link having a fore end coupled to a lower side of the housing and having an aft end pivotally coupled to the bottom panel, the load sensing link including sensing means disposed between the fore and aft ends thereof for sensing draft loads transmitted to the yoke from the drawbar.

19. An attaching mechanism for coupling an implement to a vehicle, comprising:

a housing supporting a rear vehicle axle;

a yoke comprising left and right side panels having upper portions pivotally supported by left and right extending portions of the rockshaft, respectively, and comprising a generally horizontally extending bottom panel interconnecting lower portions of the side panels;

a drawbar having a fore end pivotally coupled to the bottom panel and having an aft implement coupling end; and an actuator link having a fore end coupled to the bottom side of the housing and having an aft end pivotally connected to the bottom panel of the yoke, the actuator link including means for retracting and extending the actuator link to pivot the yoke and adjust the position of the drawbar.

20. An attaching mechanism for coupling an implement to a vehicle, comprising:

a housing supporting a rear vehicle axle;

left and right draft links, each having a fore end and having an aft implement coupling end;

a yoke comprising left and right side panels, each side panel having an upper fore portion pivotally supported by portions of the rockshaft, a generally horizontally extending bottom panel interconnecting lower portions of the left and right side panels, and left and right pivot means for pivotally supporting to the fore ends of the left and right draft links, respectively, the pivot means being disposed along an axis extending through a forward portion of the bottom panel; and a load sensing link having a fore end coupled to the housing and having an aft end coupled to the bottom panel of the yoke, the coupling axis extending through the aft end of the load sensing link, the load sensing link including sensing means interconnecting the fore and aft ends thereof for sensing draft loads transmitted to the yoke from the draft links.

21. An attaching mechanism for coupling an implement to a vehicle, comprising:

a housing supporting a rear vehicle axle;

left and right draft links, each having a fore end and having an aft implement coupling end;

a yoke comprising left and right side panels, each side panel having an upper fore portion pivotally supported by portions of the rockshaft, a generally horizontally extending bottom panel interconnecting lower portions of the left and right side panels, and left and right pivot means for pivotally supporting to the fore ends of the left and right draft links, respectively, the pivot means being disposed along an axis extending through a forward portion of the bottom panel; and an actuator link having a fore end coupled to the bottom side of the housing and having an aft end pivotally connected to the bottom panel of the yoke, the actuator link including means for retracting and extending the actuator link to pivot the yoke and adjust the position of the draft links.

* * * * *